United States Patent [19]
Cassarly et al.

[11] Patent Number: 5,842,765
[45] Date of Patent: Dec. 1, 1998

[54] TRICOLOR LIGHTING SYSTEM

[75] Inventors: William J. Cassarly; John M. Davenport, both of Lyndhurst; Richard L. Hansler, Pepper Pike, all of Ohio; Alistair Allen Miller, Peachland, Canada

[73] Assignee: General Electric Company, Schenectady, N.Y.

[21] Appl. No.: 506,448

[22] Filed: Jul. 24, 1995

[51] Int. Cl.⁶ .................. F21V 7/04; F21V 9/00; F21V 29/00; F21V 7/00
[52] U.S. Cl. .................. 362/32; 362/293; 362/294; 362/298; 362/307
[58] Field of Search .................. 362/32, 293, 294, 362/298, 307

[56] References Cited

U.S. PATENT DOCUMENTS

| | | | |
|---|---|---|---|
| 4,535,394 | 8/1985 | Dugre | 362/293 |
| 4,620,791 | 11/1986 | Combastet | 362/293 |
| 5,341,445 | 8/1994 | Davenport et al. | |

OTHER PUBLICATIONS

Nitto Optical Co., Ltd., "Optics for Image Disposition Systems", 1993.

*Primary Examiner*—Sandra L. O'Shea
*Assistant Examiner*—Matthew J. Spark
*Attorney, Agent, or Firm*—Fay, Sharpe, Beall, Fagan, Minnich & McKee

[57] ABSTRACT

A tricolor lighting system uses first and second dichroic filters or mirrors to separate light into different colors, primarily red, green, and blue. The light is directed into input ends of respective first, second, and third light guides for a desired end use at a remote location. Various embodiments use either paraboloid or ellipsoidal reflective surfaces associated with the light source and in selected embodiments, the first and second mirrors are disposed in a crossed relation to provide a compact system.

15 Claims, 6 Drawing Sheets

TRICOLOR LIGHTING SYSTEM

BACKGROUND OF THE INVENTION

This invention pertains to the art of projection lighting systems and particularly to systems that use a high brightness light source and transmit light to a remote location with light guides. The invention is particularly applicable to a lighting system such as a tricolor video system that splits the light into three colors, namely, red, green and blue. Although these systems are increasing in popularity they still suffer from optical design problems. Therefore, the invention will be described with particular reference to a lighting system that is particularly relevant to tricolor video system. However, it will be appreciated that the invention has broader applications and may be advantageously employed in related lighting environments and applications.

The current development of tricolor video systems suffer from various drawbacks. For example, light emitted by the source is inefficiently used. One solution to obtaining uniformity has been to use only the central portion of a projected light beam and disregard the outer portions of the beam. Obviously, this is counterproductive to an overall goal of maximizing light output from the system.

Still another problem is the overall size of the lighting system and the need to miniaturize the optical arrangement without any resultant loss in performance. It is oftentimes difficult to meet size limitations while simultaneously addressing efficiency in the lighting arrangement. Use of a high brightness light source, for example on the order of 50,000 lumens per square centimeter or greater, as disclosed in commonly assigned U.S. Pat. No. 5,341,445 is one factor for consideration in a compact unit. How the light is subsequently handled, i.e. after being emitted from the light source, is just as important in providing effective propagation of the light in a compact system.

Parity or uniformity between the three colors is another problem with systems of this type. Ultimately, the final image relies on all three color portions so that it is necessary to achieve as uniform a distribution as possible between the three colors.

In addition to splitting the light into component colors, the system design must address averaging, or providing a substantially equal intensity of light, across the entire cross-section of the light guides or fibers. It is desired that the intensity of light in each "blue" fiber be equal to the light intensity in every other "blue" fiber, and that the intensity of light in each "red" fiber be equal to the light intensity of every other "red" fiber, etc.

Accordingly, the need exists to improve on tricolor systems in a manner that overcomes the above-referenced problems and others and provides a simple, economical, and compact arrangement.

SUMMARY OF THE INVENTION

According to the present invention, a lighting system includes a high brightness light source located at a focus of a reflective surface, such as a paraboloid, ellipsoid, or other curvilinear reflective surface. First and second dichroic filters or mirrors receive the light directed from the reflective surface and transmit a first portion of the light received on the dichroic mirror and reflect any remaining light that is not transmitted. First, second, and third light guides are located to receive the respective portions of the light after it has been separated by the dichroic mirrors.

According to a more limited aspect of the invention, the first and second dichroic mirrors are disposed in a crossed relationship for purposes of compactness.

According to another aspect of the invention, light is directed into individual light guides through the use of lenses, prisms, or bent light rods.

A principal advantage of the invention is the effective use of all of the light emitted from the source.

A further advantage of the invention resides in the various manners of achieving a compact arrangement.

Another advantage is the uniform distribution of light into three colors.

Yet another advantage is found in averaging the light distribution among the individual light guides or fibers.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred embodiments of which will be described in detail in this specification and illustrated in the accompanying drawings which form a part hereof, and wherein.

DETAILED DESCRIPTION OF THE PREFERRED EMBODIMENTS

Referring now to the drawings wherein the showings are for the purposes of illustrating the preferred embodiments of the invention only and not for purposes of limiting same, the FIGURES show a tricolor lighting system that uses a high brightness light source in conjunction with at least a pair of dichroic filters or mirrors to separate the light into separate colors for transmission through a light guide assembly.

Figure 1:
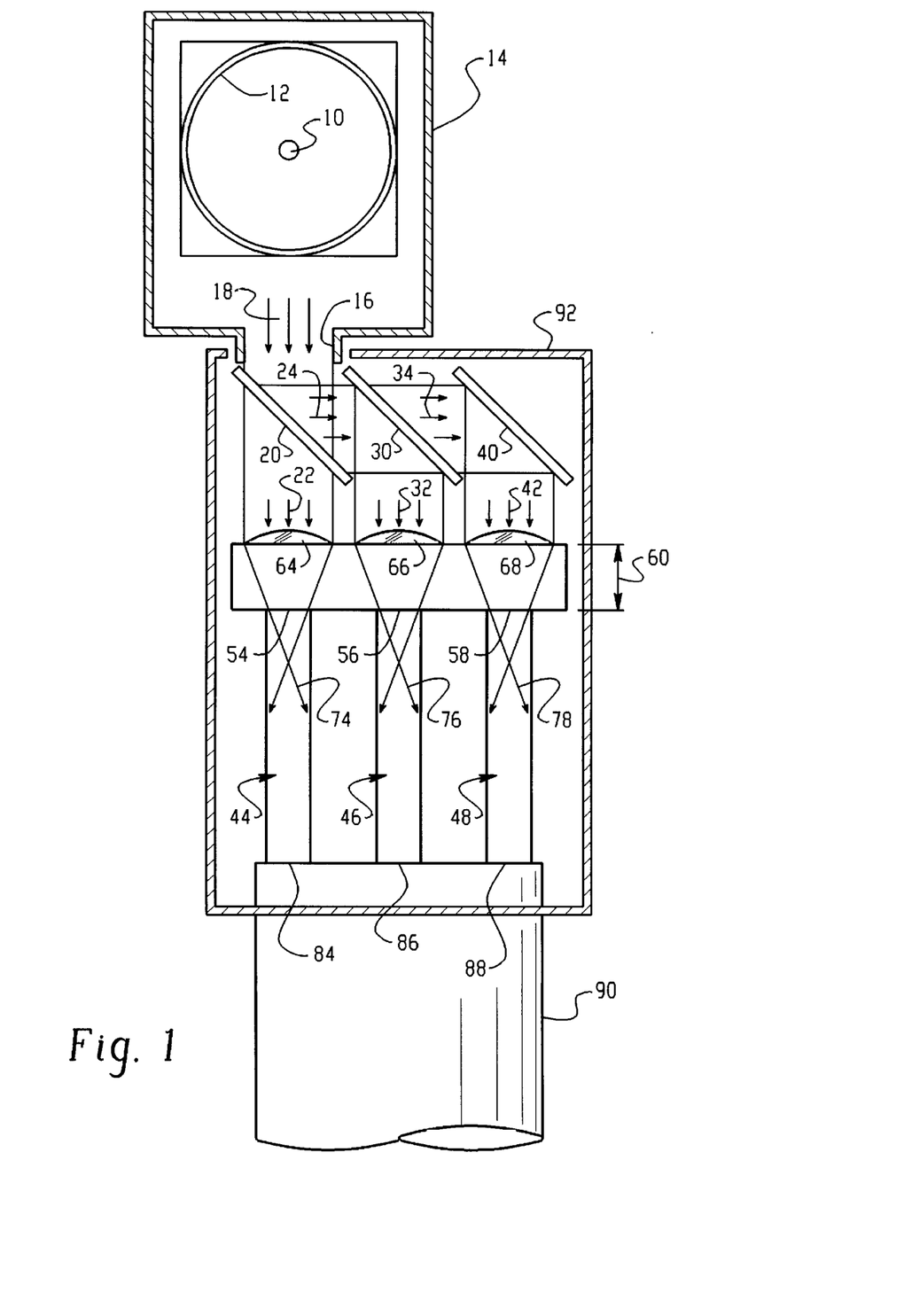
FIG. 1 is a schematic representation of a first preferred tricolor lighting system.

More particularly, and with initial reference to FIG. 1, a light source 10 is preferably located at a first focus of reflective surface 12. In this embodiment the reflective surface is preferably a paraboloid reflective surface so that location of the light source at its focus results in substantially parallel, or collimated, light rays being directed from the paraboloid reflective surface. The reflective surface is mounted in an external housing 14 that has an opening 16 that receives the light from the reflective surface. Directional arrows 18 are representative of the collimated light rays exiting the housing through the opening 16.

The light rays are directed to a first dichroic reflector or mirror 20. As shown, the dichroic mirror 20 is disposed at forty-five degrees relative to the travel path of the light rays 18. The first dichroic mirror transmits red light through the mirror and reflects the remaining light therefrom. Thus, directional arrows 22 represent the red light that is transmitted through the first dichroic mirror. Similarly, directional arrows 24 represent the remaining light reflected off the first dichroic mirror.

Since the mirror is oriented at forty-five degrees, light rays 24 travel in a direction generally perpendicular to the path of light rays 18. Moreover, the light rays 24 are directed toward a second dichroic mirror 30. This second dichroic mirror is disposed in parallel relation to the first dichroic mirror and is preferably a blue reflecting mirror. That is, light rays 32 represent blue light reflected by the second dichroic mirror. The remaining light represented by light rays 34 is transmitted through the second dichroic mirror and directed to a third mirror 40.

The third mirror is preferably a reflective mirror that reflects green light as represented by light rays 42. Alternatively, the third mirror could also be a dichroic mirror, however, a simple reflective mirror is all that is necessary since only green light 34 remains from passage through the second dichroic mirror. The third mirror is also angularly disposed at forty-five degrees so that light impinging thereon is reflected or turned through ninety degrees. By disposing the first, second, and third mirrors in spaced parallel fashion, the separate color portions of light are eventually propagated in the same direction. Accordingly, once the light has passed through the first and second dichroic mirrors 20, 30, it has been divided into three separate colors represented by light rays 22 (red), light rays 32 (blue), and light rays 34 or 42 (green).

By disposing the three mirrors 20, 30, 40 in spaced, parallel relation, the resultant rays 22, 32, 42 of the three distinct colors are all propagated in parallel arrangement toward polygonal shaped optical coupling members 44, 46, 48. Moreover, substantially all of the light that exits the housing 14 is efficiently transferred to the three mirrors so that little, if any, light is wasted. The similar treatment of the three colors also results in greater uniformity.

Input ends 54, 56, 58 of the three coupling members 44, 46, 48, respectively, abut against a triple lens block 60. The lens block includes individual positive surfaced lens 64, 66, 68 adapted to receive the collimated light transmitted through the first dichroic mirror 20, reflected from the second dichroic mirror 30, and reflected from the third dichroic mirror 40, respectively. The positive curvature or convex lenses focus the collimated light rays 22, 32, 42 into the input ends 54, 56, 58 of the individual optical coupling members. The cross-sectional shape of the optical coupling members is preferably selected from the group of rectangle, square, triangle and hexagon since these shapes provide for multiple internal reflections within the coupling members achieve some mixing of the light and reducing the differences in intensity and color from the outer edge to the center of the light output entering the optical fibers. More particular details of the coupling members are described in commonly assigned U.S. Pat. No. 5,341,445, the disclosure of which is incorporated herein by reference.

The total internal reflection is represented by crossed light rays 74 within the individual coupling members. Output ends 84, 86, 88 of the individual optical coupling members are preferably connected to a module fiber funnel 90 which is comprised of three groups of fibers (one for each color) so that light is transmitted from the coupling members, to the multiple fibers of the bundle 90, and to a remote location.

As shown, the housing 14 containing the light source 10 and reflector 12 (not shown to scale) is easily affixed to a second housing 92 that contains the three dichroic mirrors, the lens block 60, the individual coupling members 44, 46, 48, and the input ends of the individual fibers of bundle 90. This modular arrangement assures that the collimated light 18 from the reflective surface 12 is accurately aligned with the first dichroic mirror 20. The subassembly of the three mirrors, lens block, coupling members, and individual light guides can be preassembled to minimize final assembly steps and provide for modular replacement, if necessary.

Figure 2:
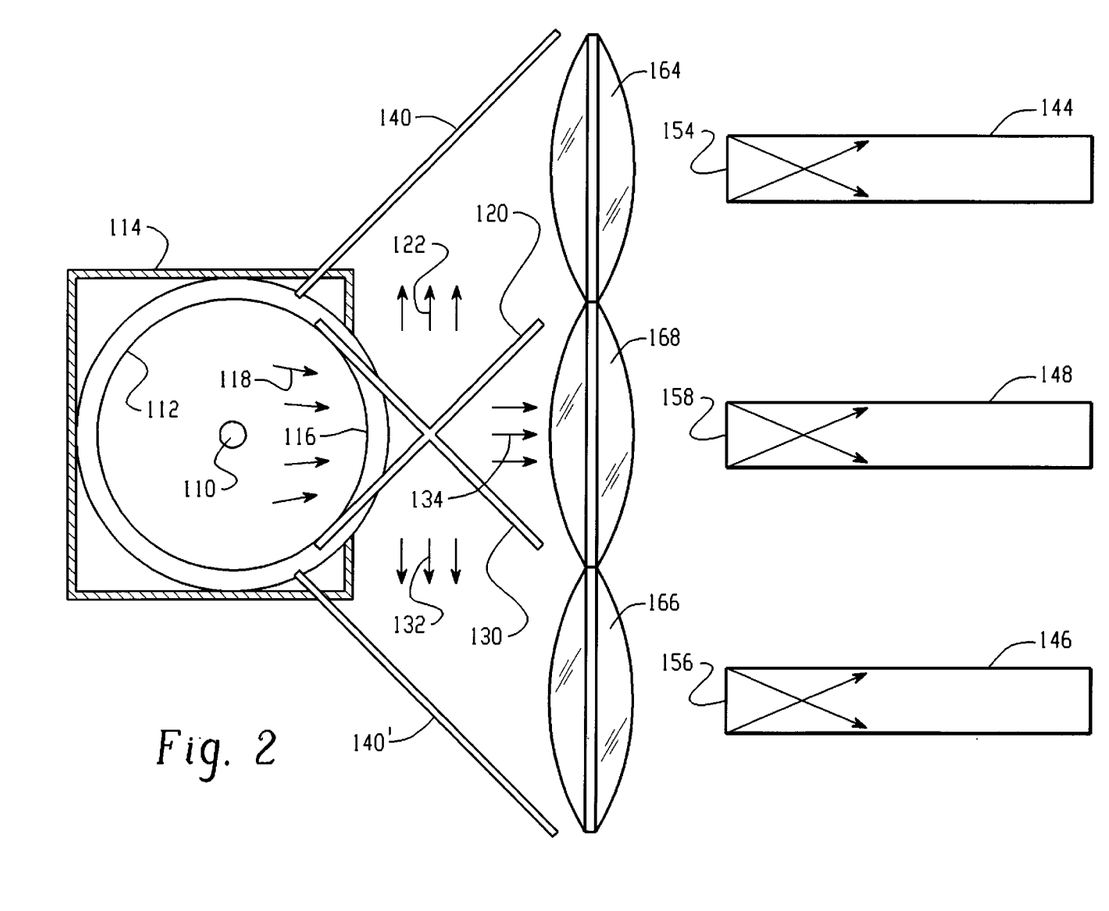
FIG. 2 is a schematic representation of a second preferred tricolor lighting system using a pair of crossed dichroic mirrors.

A more compact tricolor lighting system is shown in FIG. 2. When possible, the reference numerals are increased by a factor of one hundred, i.e. the light source in the FIG. 1 embodiment is referenced as 10 and the light source in the FIG. 2 embodiment is referenced as 110 for purposes of consistency. The light source 110 is disposed at the focus of a paraboloid reflective surface 112. If desired, the light source and reflective surface are mounted in a common housing 114. An open end 116 of the reflective surface allows the collimated light rays 118 to impinge on a first dichroic mirror 120 disposed at forty-five degrees to the direction of the light rays 118.

By way of example, the first dichroic mirror is a red reflecting mirror so that light rays 122 reflected thereby extend generally perpendicular to the path of light rays 118. Any light rays transmitted through the first dichroic mirror are absent of red color.

A second dichroic mirror 130 preferably reflects blue light. It is disposed at an angle of one hundred thirty-five degrees relative to the path of the light rays 118 reflected from the surface 112. Stated another way, the first and second dichroic mirrors 120, 130 are disposed in a crossed, generally perpendicular arrangement. This crossed arrangement results in a much more compact lighting system, an overall goal of the subject invention. Light rays 132 reflected from the second dichroic mirror 130 are blue in color and directed generally perpendicular to light rays 118 whereas the remaining spectrum of the light that impinges on the second mirror is transmitted therethrough.

Light rays 134 represent the light that has not been reflected by either the first or second dichroic mirror 120, 130. That is, this light is transmitted through both mirrors and since the red and blue spectrums have been reflected, light rays 134 are green.

A cold mirror 140 is provided to direct light rays 122 toward a first coupling member 144. Likewise, cold mirror 140' is intended to direct the light rays 132 toward a second coupling member 146. The cold mirrors 140, 140' are oriented at forty-five degree angles to the paths of the light reflected by the first and second dichroic mirrors, respectively, so that the light is redirected in a direction parallel to light rays 134 and toward the coupling members 144, 146.

The third coupling member 148 receives the light rays 134. Before reaching the respective input ends 154, 156, 158 of the first, second, and third coupling members 144, 146, 148, the light rays pass through one of the focusing lenses 164, 166, 168, respectively. The lenses thus receive substantially collimated light and focus the red, blue, and green portions of the light into the input ends of the individual coupling members. Thereafter, the light is internally reflected through the coupling members and after it exits the couplers, it enters input ends of fiber bundles where the light is then conveyed to a remote location (not shown).

The compact arrangement of FIG. 2 is achieved, in part, because of the crossed relation of the first and second dichroic mirrors. The mirrors also preferably extend from the edges of the reflective surface, as do the cold mirrors 140, 140', so that all of the light emitted from the source is effectively used in the lighting system and eventually is transmitted through the light guides.

Figure 3:
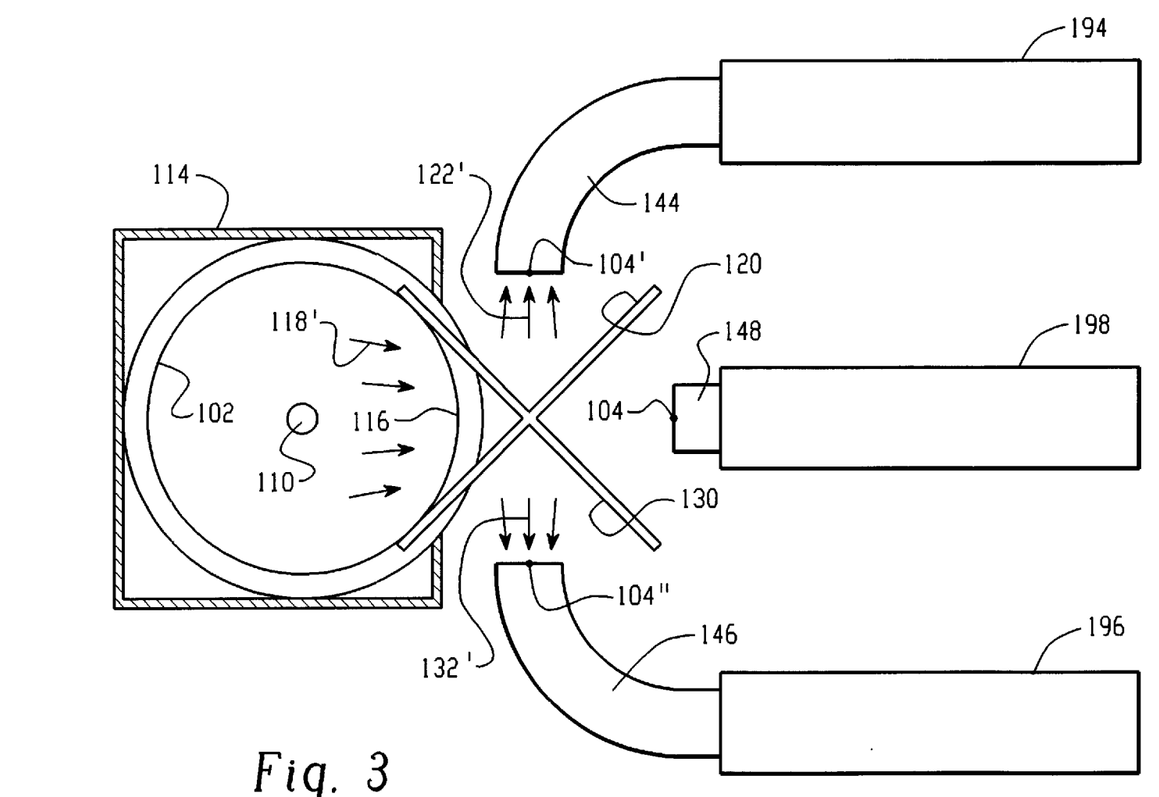
FIG. 3 is a schematic representation of a lighting system similar to that of FIG. 2 that uses bent light rods to ultimately propagate the light portions in the same direction.

Turning now to FIG. 3, the structural arrangement and operation of the individual components is closely related to that in FIG. 2. Therefore, like numerals will be used to reference like elements and new numerals are used to reference new elements. Essentially, the FIG. 3 embodiment is substantially similar to that described above with respect to FIG. 2 except that the cold mirrors 140, 140' have been removed, the paraboloid reflective surface replaced by an ellipsoidal reflective surface, and a pair of bent light rods or pipes used for more compact, efficient collection of the red and blue light reflected from the first and second dichroic mirrors 120, 130, respectively.

More specifically, reflective surface 102 has an elliptical configuration and the light source 110 is located at a first focus thereof. The first and second dichroic mirrors are disposed in crossed relation, and the vertex defined by the crossed mirrors is interposed between the first and second foci of the ellipsoidal reflective surface. That is, the second focus 104 is preferably located rightwardly of the vertex as shown. The vertex is positioned along the major axis defined between the focus 104 and the light source 110.

Virtual foci 104' and 104" are located at inlet ends of coupling members 144, 146, respectively. Thus, the red light reflected by the first dichroic mirror 120 is generally directed toward the virtual focus 104' of the bent coupling member 144. The coupling member 144 has a ninety degree bend so that once the light enters fiber bundle 194, it is propagated in generally the same direction as any light that enters second and third fiber bundles 196, 198. The same principles apply with regard to the virtual focus 104". That is, the blue light reflected by the second dichroic mirror 130 enters the coupling member 146. It is then bent or directed through a ninety degree turn so that it enters and continues to propagate rightwardly, as shown, through the second fiber bundle 196.

Focus 104 receives light that has been transmitted through both of the dichroic mirrors and enters the third coupling member 148 positioned adjacent the input end of the third fiber bundle 198. The ellipsoidal configuration of reflective surface 102 converges light rays 118' on the second focus 104. Continued travel of the light is then achieved through internal reflection through the fiber bundle 198.

A comparison of FIGS. 2 and 3 also illustrates the elimination of the lenses from the FIG. 3 embodiment. Eliminating the lenses improves overall system brightness since a greater amount of lumens are provided in a smaller area. Moreover, the overall arrangement of FIG. 3 is even more compact than the tricolor lighting system of FIG. 2.

Figure 4:
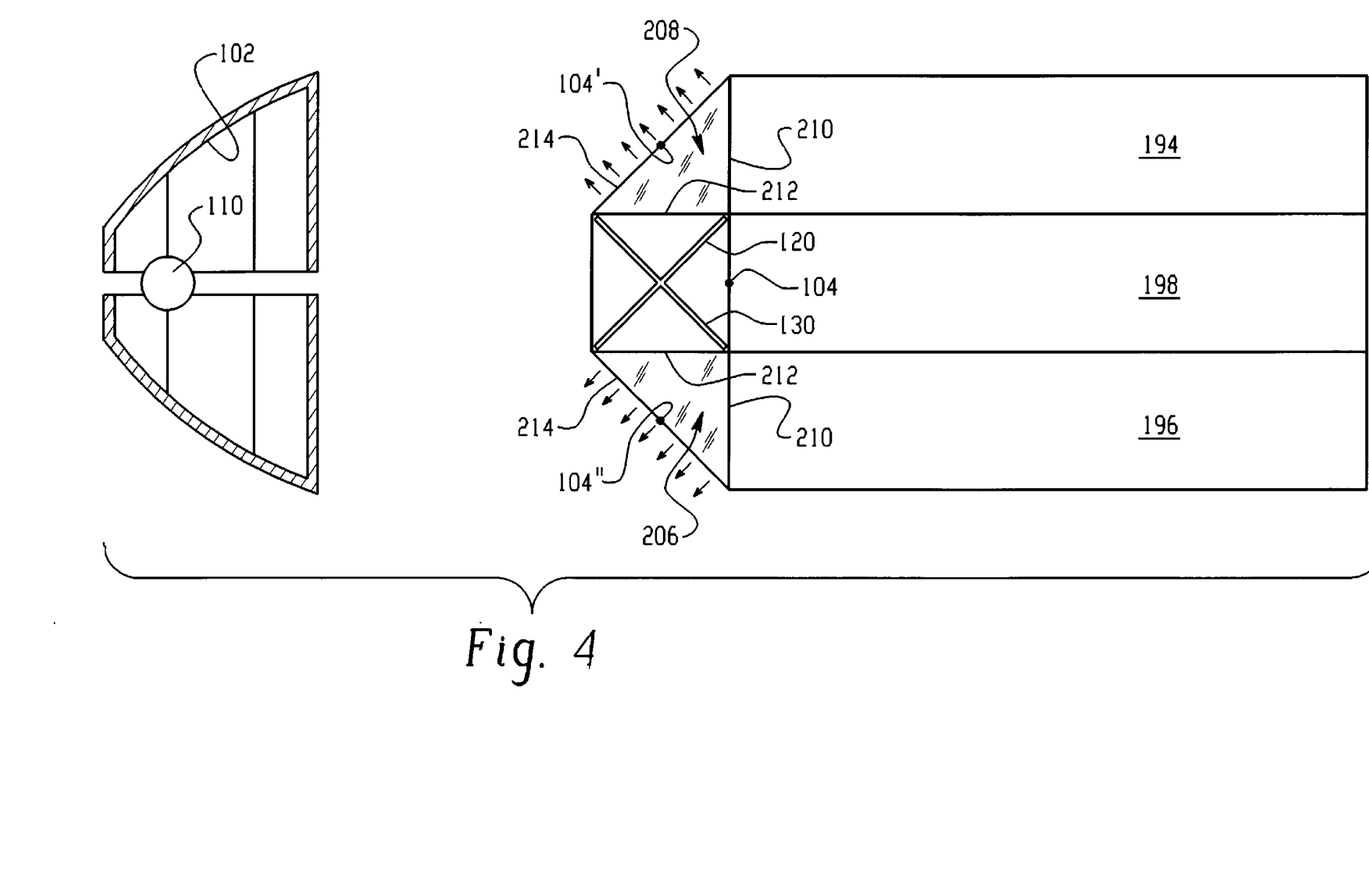
FIG. 4 is a schematic representation of a lighting system that uses forty-five degree prisms to achieve a ninety degree bend with two portions of the light.

A fourth preferred embodiment in FIG. 4, not shown to scale, also employs many of the same structural elements as in the FIG. 3 embodiment. Accordingly, like numerals will again refer to like elements while new numerals will refer to new elements. The light source 110 is preferably located at a first focus of the ellipsoidal reflective surface 102. Light rays 118' are thereby directed toward a second focus at the input end of the third light fiber bundle 198. The optical coupling members 144, 146, 148 of the FIG. 3 embodiment are eliminated and forty-five degree prisms employed in their place. The prisms 206, 208 are disposed so that the faces 210, 212, which are oriented ninety degrees relative to one another, are located adjacent the input end of the fiber bundle and along the crossed dichroic mirrors, respectively. The reflective or angular face 214 of the prisms redirect the light through ninety degrees for total internal reflection of the light as it enters the respective first and second light guides. Light that would otherwise be directed out of the optical system is totally internally reflected in the prisms and remains in the desired optical path.

An important aspect in using the prisms is that the surfaces 210, 212 must include a low index of refraction material. For example, air or magnesium fluoride are preferred low index of refraction materials that contribute to the operation of the optical system when the prisms are used. The three light fiber bundles or light guides 194, 196, and 198 can then be disposed adjacent one another and oriented in the same direction so that the light is generally propagated in three separate colors and in the same direction.

Moreover, a commercially available cubical prism is available from Nitto Optical Co., Ltd. of Tokyo Japan. It includes a pair of dichroic mirrors contained therein and oriented in the desired crossed relation. It has been determined that by polishing the surfaces of the cubical prism that are perpendicular to both of the dichroic mirrors (since the commercially available prism is not so polished), a greater percentage of the light reflected therein is eventually transmitted from the cubical prism. Moreover, the polishing of the vertical and horizontal surfaces of the prism achieves improved light averaging and even distribution of light intensity.

Figure 5:
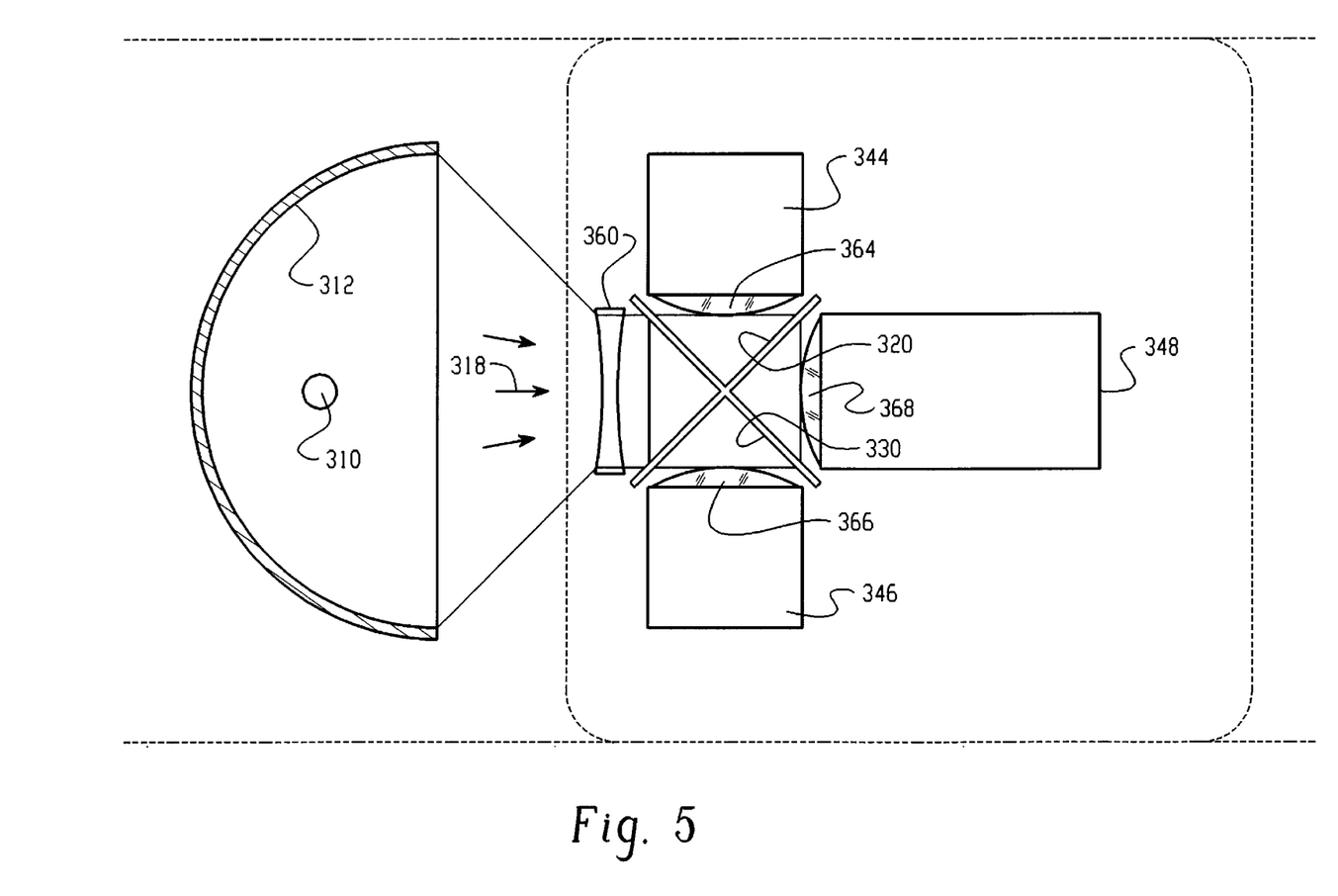
FIG. 5 is yet another schematic representation of a preferred tricolor lighting system.

As shown in FIG. 5, still another preferred arrangement is disclosed using an ellipsoidal reflective surface. A light source 310 is disposed at one focus of ellipsoidal reflective surface 312. The light rays 318 generally converge toward the second focus. A vertex of crossed first and second dichroic mirrors 320, 330 is located between the first and second foci of the reflective surface. Before reaching the focus or vertex, however, the light rays pass through a negative surface lens, i.e., one having a pair of concave surfaces, to collimate the light prior to it reaching the dichroic mirrors. The mirrors are again disposed at forty-five degree angles relative to the propagated direction of the light exiting the lens 360. Thus, the first dichroic mirror 320 reflects the red light into the first light fiber bundle or light guide 344. Likewise, the second dichroic mirror 330 reflects the blue light into the second light fiber bundle or light guide 346. The remaining light transmitted through the dichroic mirrors reaches the third light fiber bundle or light guide 348.

In order to assure total internal reflection of the light reflected by or transmitted through the dichroic mirrors, positive surface lens 364, 366, 368 are associated with the input ends of each of the light guides to obtain the highest number of lumens per square centimeter possible, i.e., reduce the size of the light spot. In this manner, the light is propagated through the light guides via total internal reflection and may be directed to a remote location.

Figure 6:
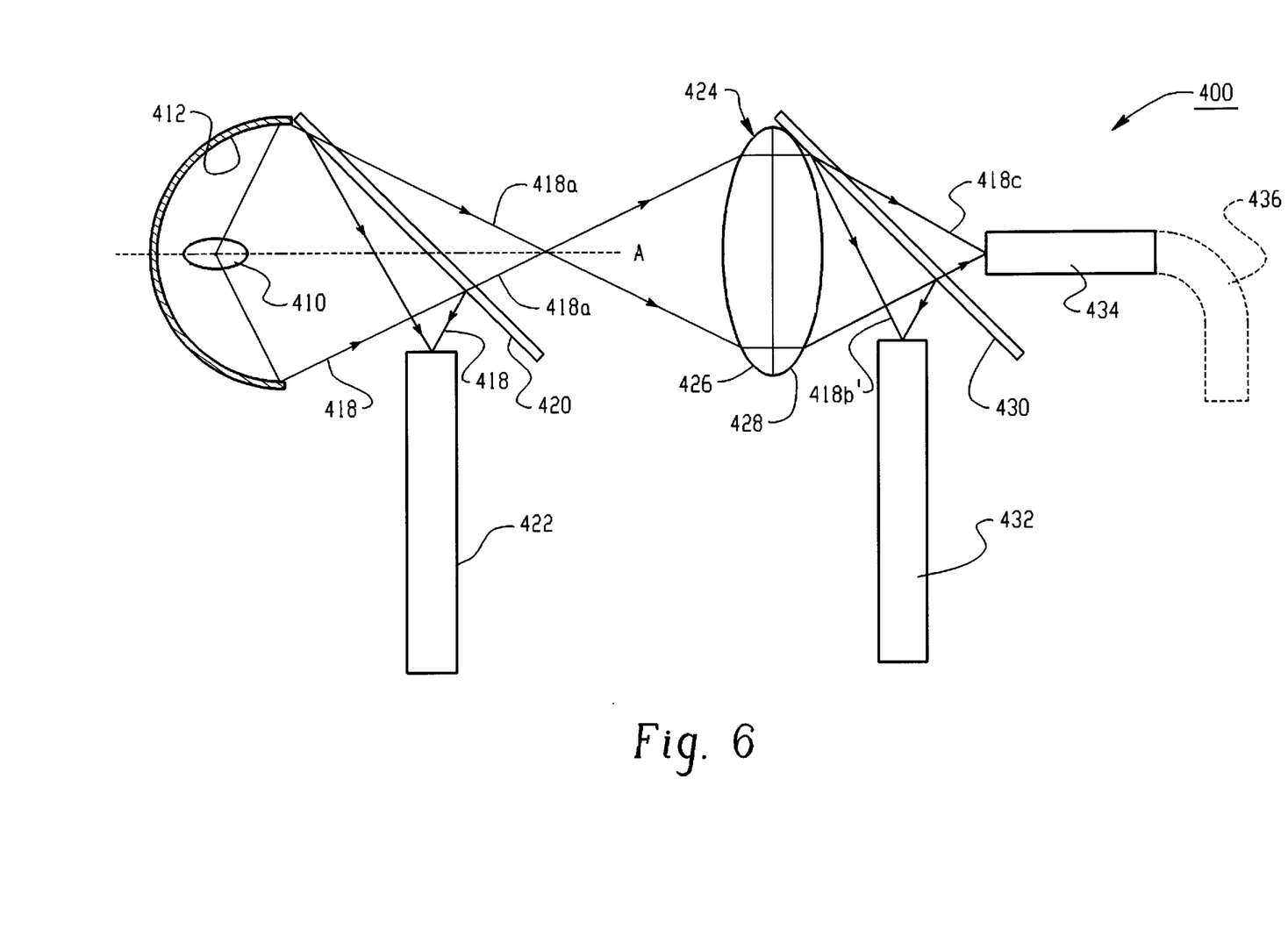
FIG. 6 is another schematic representation of a preferred tricolor lighting system.

As shown in FIG. 6, yet another preferred arrangement of a tricolor lighting system is illustrated wherein the light source 410 is disposed at the first optical focal point of an ellipsoidally shaped reflector member 412. The light rays 418 again generally converge toward the second focus. A beam splitting mirror 420 is disposed in the path of the light rays 418 before the second focus and at approximately a 45 degree angle relative to the longitudinal axis A of the reflector member 412. Beam splitting mirror 420 has a coating which allows such mirror 420 to filter either the long or the short wavelength ends of the visible spectrum with the balance of the light rays 418a being transmitted therethrough. Beam splitting mirrors of this type are commercially available from Melles Griot, Inc. and are identified in their product manual "Optics Guide 5" as product numbers 03 BTF 007 and 03 BTF 023 shown at page 13-4 of this product manual. The light rays 418' that are reflected by the beam splitting mirror 420 are directed to the input end of a first optical coupler member 422 which can be provided by a polygonally shaped coupler member as described in U.S. Pat. No. 5,341,445 issued on Aug. 23, 1994 to Davenport et al and assigned to the same assignee as the present invention. For instance, the reflected light rays 418 could be those light rays that are from the blue region of the visible spectrum thereby resulting in the separation of blue light along the path formed by the first coupler member 422.

A compound condensing lens 424 is disposed in the path of the balance of the light rays 418a. Compound collecting lens 424 is composed of two aspheric lenses 426 and 428 which are disposed in a back-to-back relation to one another. The compound collecting lens 424 is effective for collecting the balance of the light rays 418a and focussing them into a spot which is located at a distance equal to the distance between the first focus and the lens. In this manner, the light pattern or spot at the second focus is the same size and therefore the same brightness as the light spot at the first focus. Disposed in the path of the balance of the light rays 418a is a second beam splitting mirror 430. The second beam splitting mirror 430 is also disposed at a 45 degree angle relative to axis A and also acts as a filter having a coating thereon. The second beam splitting mirror 430 is effective for reflecting the light rays 418a' at the center part of the spectrum and transmitting the remaining end of the visible spectrum therethrough; such remaining light rays being identified as 418c. Light rays 418b' which are reflected by the second beam splitting mirror 430 can be for instance, the green region of the visible spectrum and such light rays can be focussed to a light spot which is input to a second optical coupler member 432. Light rays 418c which are transmitted through mirror 430 can be the red region of the visible spectrum and can be focussed into a light spot which is input to a third optical coupler member 434.

In order to bring the light of all three colors out at the same side of the centralized light source 410, a 90 degree optical turning device 436 can be utilized in conjunction with the red light rays 418c. Of course, it should be understood that the order of blue, green and red can be reversed by reversing the first and second beam splitting mirrors and such a modification would be within the scope of the present invention. It would also be possible to include a bundle of optical fibers to transmit the various colored light outputs to different locations and such bundles of optical fibers can be connected at input or output ends of the optical coupler members 422, 432, and 434.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

What we claim as new and desire to secure by Letters Patent of the United States is:

1. A lighting system comprising:
   a source for emitting light;
   a reflective surface receiving the emitted light from the source and redirecting the light in a desired direction, the source being located at a focus of the reflective surface;
   a first dichroic mirror receiving light from the reflective surface and transmitting received light of a first selected color and received light of a second selected color therethrough and reflecting received light of a third selected color;
   a second dichroic mirror receiving light from the reflective surface and transmitting received light of the second selected color and received light of the third selected color and reflecting received light of the first selected color;
   a first light guide having an input end for receiving reflected light of the first selected color reflected by the second dichroic mirror and an output end spaced from the input end for emitting light of the first selected color;
   a second light guide having an input end for receiving reflected light of the third selected color reflected from the first dichroic mirror and an output end spaced from the input end for emitting light of the third selected color;
   a third light guide having an input end for receiving transmitted light of the second selected color and an output end spaced from the input end for emitting light of the second selected color.

2. The lighting system as defined in claim 1 wherein the first and second dichroic mirrors are disposed in crossed relation so that light that is received in the input end of the third light guide has been transmitted through both the first and second dichroic mirrors.

3. The lighting system as defined in claim 1 further comprising a third mirror interposed between the second dichroic mirror and the input end of the third light guide.

4. The lighting system as defined in claim 1 further comprising first, second, and third lenses located adjacent the input ends of the first, second, and third light guides, respectively for focusing light entering the light guides.

5. The lighting system as defined in claim 1 wherein the first and second dichroic mirrors are disposed in generally perpendicular crossed relation, the input end of the third light guide being located at a second focus of the reflective surface.

6. The lighting system as defined in claim 1 wherein the input end of the third light guide receives light that has passed through both the first and second dichroic mirrors.

7. The lighting system as defined in claim 1 further comprising a lens interposed between the reflective surface and the dichroic mirrors, the lens collimating the light from the reflective surface and directing it toward the first and second dichroic mirrors.

8. The lighting system as defined in claim 7 wherein the first and second dichroic mirrors are disposed in generally perpendicular crossed relation.

9. The lighting system as defined in claim 8 wherein the input end of each light guide includes a lens having a positive curved surface.

10. The lighting system as defined in claim 1 wherein the reflective surface is a paraboloid collector that collimates light received from the light source.

11. The lighting system as defined in claim 10 wherein the first dichroic mirror is disposed at forty-five degrees to a propagation direction of the collimated light from the reflective surface, the light transmitted through the first dichroic mirror entering the input end of the first light guide, and light reflected by the first dichroic mirror being directed toward the second dichroic mirror.

12. The lighting system as defined in claim 11 wherein the second dichroic mirror is generally parallel to the first dichroic mirror and receives light reflected by the first dichroic mirror, reflecting a portion of the light toward the input end of the second light guide and transmitting the remainder therethrough.

13. The lighting system as defined in claim 12 further comprising a third dichroic mirror that is generally parallel to the first and second dichroic mirrors, reflecting at least a portion of the light transmitted through the second dichroic mirror toward the input end of the third light guide.

14. A lighting system comprising:
   a source for emitting light;
   a reflective surface receiving the emitted light from the source and redirecting the light in a desired direction;
   first and second dichroic mirrors receiving light from the reflective surface and transmitting a first portion of the light therethrough and reflecting a remaining portion of the light, the dichroic mirrors being disposed in generally perpendicular, crossed relation;
   a first light guide having an input end for receiving light from the first dichroic mirror and an output end spaced from the input end for emitting light of a first selected color at a remote location;
   a second light guide having an input end for receiving light from the second dichroic mirror and an output end spaced from the input end for emitting light of a second selected color at the remote location; and
   a third light guide having an input end that receives light transmitted through both the first and second dichroic mirrors and an output end spaced from the input end for emitting light of a third selected color at the remote location.

15. The lighting system as defined in claim 14 wherein the reflective surface has an ellipsoidal configuration and first and second foci where the source is located at a first focus thereof and a vertex of the crossed first and second dichroic mirrors is located between the first and second foci of the reflective surface.

* * * * *